United States Patent [19]

Koutsky et al.

[11] 3,957,304
[45] May 18, 1976

[54] RESTRAINT FOR A VEHICLE SEAT AND SEAT BELT

[75] Inventors: L. John Koutsky, Milan, Ill.; John W. Carter, Davenport, Iowa

[73] Assignee: Sears Manufacturing Company, Davenport, Iowa

[22] Filed: May 30, 1975

[21] Appl. No.: 582,084

[52] U.S. Cl. .............................. 297/385; 248/393; 248/399; 297/216
[51] Int. Cl.² .................. B60R 21/10; A62B 35/00
[58] Field of Search ............ 297/385, 216; 248/399, 248/400, 401, 402, 393; 280/150.5 B

[56] References Cited
UNITED STATES PATENTS

| | | | |
|---|---|---|---|
| 3,288,422 | 11/1966 | Krause | 297/385 X |
| 3,377,102 | 4/1968 | Hendrickson | 297/385 |
| 3,572,832 | 3/1971 | Graham | 297/385 X |
| 3,692,361 | 9/1972 | Ivarsson | 297/385 |
| 3,743,230 | 1/1973 | Freedman | 248/399 |
| 3,785,701 | 1/1974 | Gillmore | 297/385 |
| 3,799,609 | 3/1974 | Cunningham | 248/399 X |
| 3,811,727 | 5/1974 | Rumpel | 248/393 X |
| 3,845,987 | 11/1974 | Bashford | 297/385 |

*Primary Examiner*—James T. McCall
*Attorney, Agent, or Firm*—Glenn H. Antrim

[57] ABSTRACT

Vehicle seat assemblies, including seats and their suspensions that are to be mounted to rigid structure of vehicles, have restraint ties completely contained within the assemblies. The ties restrict the amount of upward and forward movement of the seats when they and their occupants are subject to abnormal forces when the vehicles roll over or are involved in other accidents. Each restraint tie is made from strong, flexible material such as wire rope; one end of a tie is connected to one frame of an assembly at the top of its suspension, and the other end is connected to another frame at the bottom of the suspension. The latter frame may be the movable member of a rugged fore-and-aft adjusting mechanism. In addition, pelvic restraint belts are connected to a frame at the top of the suspension.

4 Claims, 5 Drawing Figures

RESTRAINT FOR A VEHICLE SEAT AND SEAT BELT

BACKGROUND OF THE INVENTION

This invention relates to vehicle seats and more particularly to seat assemblies having integral flexible restraints of high tensile strength to resist upward and forward movement of the seats and their occupants during application of forces encountered in accidents.

Vehicle seat assemblies commonly have resilient, shock-absorbing suspensions and height adjusting mechanisms disposed between respective seat frames and lower frames, the lower frames to be secured to rigid structure of vehicles. Preferably, when pelvic restraint belts are to be used, they are secured to the seat frames. The amount of strength that must be built into the seat assemblies to resist accidental forces directed upwardly and forwardly on the seats and their restraint belts depends on the usage of the vehicles to which the assemblies are secured.

When the vehicles are used for road construction or are used any place where they might roll over or collide with other vehicles, manufacturers' specifications require that the seats and the pelvic restraint belts resist much greater testing forces, forces as great as 5,000 pounds (22,240 newtons) or more. To provide that much strength in the resilient suspension is economically impractical. To bypass the suspensions by providing anchorages for pelvic restraint belts directly at floor level on the firm structure is undesirable because in such arrangements, the belts tend to pull uncomfortably on the occupants as the seats move up and down on their suspensions, and when not in use, the belts are likely to become dirty from being on the floors of the vehicles. In other arrangements where seats are strengthened by connecting flexible ties to points on the rigid structure back of the seats, the lengths of the ties need to be adjusted to maintain a desirable amount of slack in the ties for different positions of the seats resulting from different fore-and-aft leg adjustments. Furthermore, specifications require the positions for the anchorages for either ties or belts to be back of the seats, but space back of the seats at floor level on vehicles is often not available for anchorages.

SUMMARY OF THE INVENTION

Vehicle seat assemblies have flexible ties of high tensile strength connected between their seat frames and respective lower suspension frames. For all except the uppermost position of a seat during normal use, the ties are slack, but for the uppermost position expected in normal use or for that position when it is obtained by application of abnormally great upward and forward force, the ties become taut to restrict the movement of the seat and its attached pelvic restraint belts with respect to the vehicle on which it is mounted. Since much of the abnormally great force bypasses the suspension of the seat, a usual good suspension of moderate cost is satisfactory for those usages requiring maximum restraining strength for the seat and its pelvic restraint belts. Installation of a complete seat assembly is facilitated because the ties are integral with the entire assembly and therefore do not require separate anchorages to the rigid structure.

Preferably, the only structure between the rigid structure of the vehicle and the lower suspension frame, to which the restraining ties are connected, is that for providing different fore-and-aft leg room to suit different operators of a vehicle. For seat assemblies that are to have great restraining capabilities, the fore-and-aft adjustable structures are especially designed with heavy-duty runners, rails, and latching mechanisms. By having the fore-and-aft adjustable structure outside the span of the flexible restraining ties, the length of the ties need not be readjusted for different fore-and-aft adjustments. For economy, the restraining ties make it possible to use available good spring suspensions and height adjusting mechanisms of seat assemblies that have been designed to have moderate restraining strength, in seat assemblies that must have maximum restraining strength.

DESCRIPTION OF THE PREFERRED EMBODIMENTS

Figure 1:
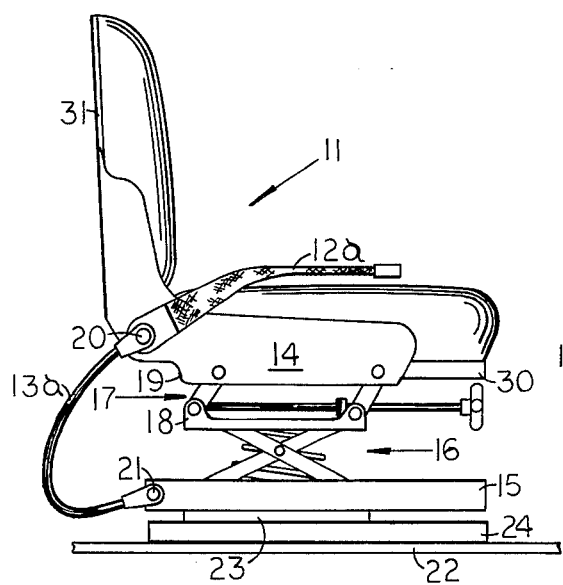
FIG. 1 is a side view of a seat and suspension assembly with a restraining tie.
Figure 2:
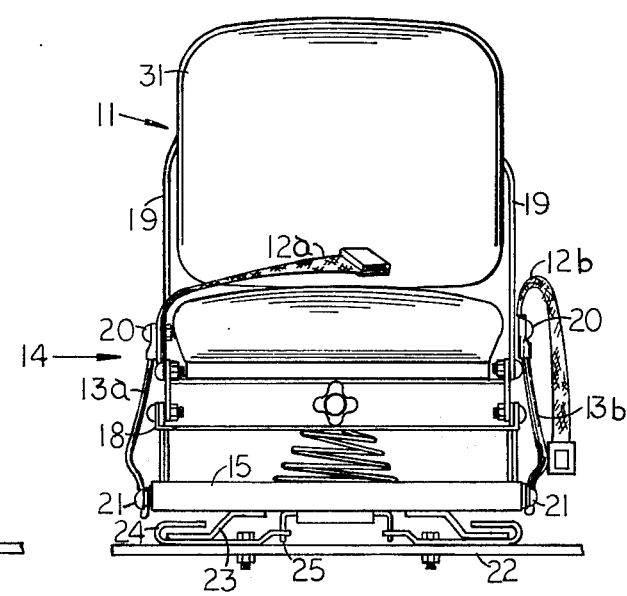
FIG. 2 is a front view of the seat and suspension assembly showing a restraining tie connected at each side of the assembly.

As shown in FIGS. 1 and 2, a vehicle or tractor seat and suspension assembly 11 is shown equipped with a pair of pelvic restraint belts 12a–12b and a pair of seat restraining ties 13a–13b. The ties 13a–13b prevent abnormal separation of parts of the seat assembly 11 and ensure that the seat frame 14 is a dependable anchorage for the belts 12a–12b.

The ties 13a–13b are applicable to most vehicle seat assemblies of various construction. A typical assembly 11 includes a sturdy seat frame 14 for supporting a seat cushion and a back. Specifically, the seat frame 14 herein is defined to include a rugged side bracket 19 that is the basic structure to which is attached a seat pan 30 and a back 31. To cushion the ride for the occupant of the seat, the seat assembly has a resilient, shock-absorbing suspension 16 with a resilient member between the seat frame 14 and a lower frame 15 of the suspension. The suspension 16 comprises a lever arrangement such as a pair of scissor linkages to maintain the seat frame 14 parallel with the structure on which the assembly is mounted, a resilient member, such as a coil spring, and a shock absorber (not shown) to provide the desired damped resiliency in a vertical direction The suspension 16 shown in the FIGS. 1–5 is to represent any of the well-known suitable suspensions having commonly used lever arrangements such as scissors, cantilevers or parallel linkages in combination with resilient members such as coil springs, conical springs, leaf springs, torsion springs, or air bags. The seat restraint ties 13a–13b work satisfactorily for seats with different types of suspension. Adjustment mechanisms such as the height adjustment 17 may be interposed either above or below the suspension 16. When a height adjustment 17 is above the suspension 16, the upper end of the suspension 16 is an intermediate frame 18 rather than the seat frame 14. The intermediate frame 18 is then connected through supporting members of the height adjustment 17 to the seat frame 14.

Each of the pair of pelvic restraint belts 12a–12b is connected to a respective side bracket 19 of the seat frame 14. As shown in FIG. 1, one end of the restraint belt 12a is connected to a rear portion of the side bracket 19 that is about even with a top of a cushion placed on the seat pan 30. A strong stud or bolt 20 is used to secure the upper end of the seat restraint tie 13a to the side bracket 19, and conveniently, the seat belt 12a can also be connected to the bolt 20. The lower end of the seat restraint tie 13a is connected to a stud 21 that is connected to the side of the lower frame 15 of the suspension 16 at a point nearly directly below the stud 20. The restraint ties 13a–13b can be made of any flexible material that has sufficient tensile strength to withstand a specified testing force to be applied to the seat frame 14. Each of the seat restraint ties 13a–13b is just long enough to allow the seat frame 14 while it is adjusted to its maximum height to move upward as much as required by the functioning of its suspension for good riding comfort.

The ends of the seat restraint ties 13a–13b are attached to the respective frames in any suitable manner. For example, the ties may be fabricated from strong wire rope, and each of the fasteners 20–21 may be a stud or a bolt having sufficient space on its shank between an outer head and the respective frame to accommodate a loop at the end of the wire rope. The loop in each end of the seat restraint ties 13a–13b may be retained by a conventional swaged sleeve. Each of the seat belts 12a–12b may be attached to their respective studs 20 adjacent the respective side bracket 19 before one of the seat restraint ties 13a–13b is attached.

Since the seat restraint ties 13a–13b are connected between only those frames of the seat assembly 11 above a fore-and-aft positioning mechanism, the ties are always the right length to become taut at the uppermost normal positions of the seat frame 14 on its suspension 16 and height adjustment 17 regardless of the fore-and-aft adjustment of the seat. An extra heavy-duty sliding or a rolling support to provide fore-and-aft adjustments is mounted between the lower frame 15 of the suspension 16 and the rigid frame 22 of a vehicle. In FIG. 2, a pair of spaced runners or movable members 23 secured to the bottom of the lower frame 15 of the suspension 16 is a sliding fit in a pair of spaced mating rails or fixed members 24 that are secured to the rigid frame 22. The lower frame 15 and the runners 23 can be considered as a unit with the lower end of the ties 13a–13b connected to the runners or movable members 23 of the fore-and-aft adjustment. A latching mechanism 25 is connected to the lower frame 15 and engages the rails 24 to provide a latch. The runners, rails, and latch must be strong enough to hold the runners 23 fixed to the rigid frame of the vehicle to which the seat assembly 11 is attached even when the maximum testing force is applied to the seat frame 14. The necessary strength for the fore-and-aft positioning mechanism can be obtained more easily than a comparable strength without use of ties in the resilient suspension because of the relatively short dimensions of the individual runners 23 and rails 24 in lateral and vertical dimensions. The lower ends of the seat restraining ties 13a–13b are effectively connected to the sliding runners 23.

Figure 3:
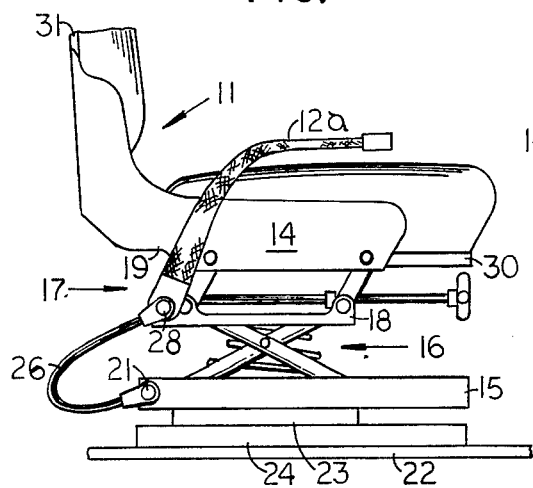
FIG. 3 is a side view of a seat and suspension assembly to show a restraining tie connected to an intermediate frame.

With reference to FIG. 3, when the vehicle seat 11 is the type that has an intermediate frame 18, the seat restraint tie and the seat belt at each side of the seat may be connected to the intermediate frame. More particularly, the lower end of a restraining tie 26 is connected to the stud 21 that is secured firmly to the lower frame 15 of the suspension 16, and the upper end of the tie 26 is connected to a stud 28 that is secured to the intermediate frame 18. The tie 26 is normally slack, except it becomes taut as the frames 15 and 18 between which it is connected, approach a normal, maximum spacing.

The suspension 16 as shown in the drawings provides resiliency for riding comfort, but a savings in the cost of the seat assemblies can be obtained by substituting a rigid support for the suspension 16. The restraining ties 13a–13b are still necessary to strengthen the support and particularly when the seat belts 12a–12b are connected to the side bracket 19 of the seat frame 14, to prevent breakage of adjusting mechanisms such as height adjustment 17 connected above the support.

Figure 5:
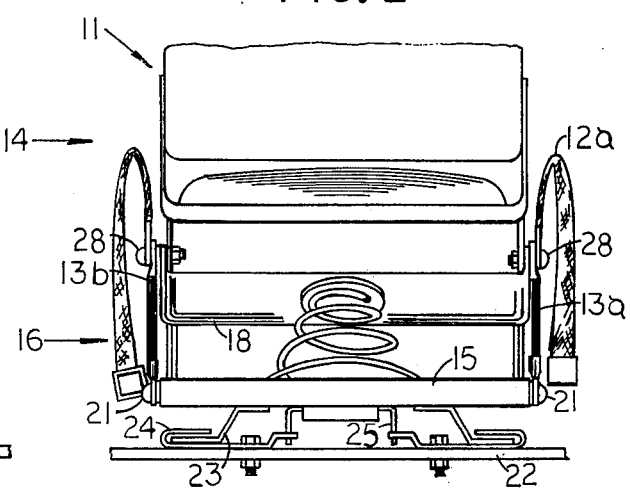
FIG. 5 is a rear view of the assembly of FIG. 4 while test force is applied.
Figure 4:
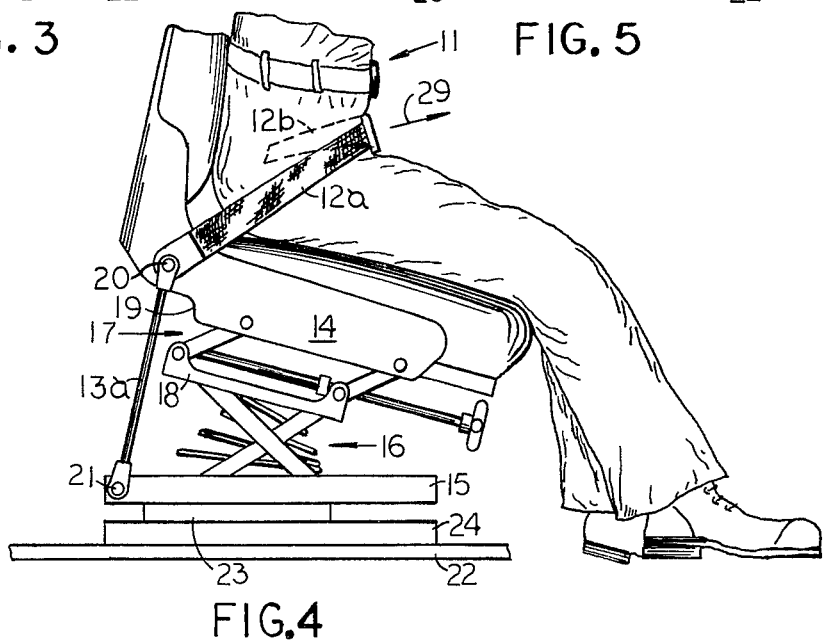
FIG. 4 is a side view of a seat and suspension assembly to show the position of its seat while a test force is applied to its restraint belt.

When a testing force in the direction of the arrow 29 of FIG. 4 is applied to the upper frame 14 either directly or through the seat belts 12a–12b, the rear portion of the seat frame 14 will be brought upwardly and forwardly, as shown in FIGS. 4 and 5, on the resilient support 16 until the seat restraint ties 13a and 13b are taut. The latching mechanism 25 of the fore-and-aft adjustable structure must not release or break as the maximum testing force is applied. While the force between the firm base structure 22 and the upper frame 14 is maximum, parts of the seat assembly 11 may be deformed, but the seat assembly is still within safety specifications providing no breakage occurs.

We claim:

1. A vehicle seat assemby with a strong flexible restraint tie completely contained therein comprising: a seat including a seat frame for supporting a horizontal cushion and an upright back, a rugged fore-and-aft adjustment having a fixed member and a movable member, a spring suspension having upper and lower ends, means connecting said lower end to said movable member, means connecting said upper end to said seat frame for suspending said seat frame above said fore-and-aft adjustment, said seat having a normal uppermost position for riding comfort, fastening means for securing said fixed member to rigid structure of a vehicle, said strong flexible restraint tie having one end connected to said seat frame and its other end connected to said movable member, the ends of said tie being secured at points approximately in a vertical line with said back, the length of said tie being such that said tie becomes taut in said normal uppermost position of said seat frame, and a seat belt connected to said seat frame.

2. A vehicle seat assembly as claimed in claim 1 wherein said means for connecting said upper end of said spring suspension to said seat frame includes a height adjusting mechanism connected between said upper end of said spring suspension and said seat frame.

3. A vehicle seat assembly as claimed in claim 2 wherein an intermediate frame is disposed between said upper end of said suspension to said height adjusting mechanism, and said tie and said seat belt are connected to said intermediate frame.

4. A vehicle seat assembly with a strong flexible restraint tie completely contained therein comprising:
- a seat frame for supporting a horizontal cushion and an upright back, a rugged fore-and-aft adjustment having a fixed member to be fastened to rigid structure of a vehicle and a movable member to be adjustable in a fore-and-aft direction with respect to said vehicle,
- a height adjusting mechanism connected to said seat frame,
- a seat support having a lower end secured to said movable member of said fore-and-aft adjustment and an upper end connected to said height adjusting mechanism, said height adjusting mechanism being adjustable to position said seat frame at a desired height over said seat support, said seat frame having a normal uppermost position,
- said strong flexible restraint tie having a lower end connected to said movable member of said fore-and-aft adjustment and an upper end connected to said seat frame, said ends of said strong flexible restraint tie being on approximately a vertical line through said back, said tie becoming taut as said height adjusting mechanism is adjusted to position said seat frame in said normal uppermost position, and a seat belt connected to said seat frame.

* * * * *